US006823669B2

(12) United States Patent
Kogan et al.

(10) Patent No.: US 6,823,669 B2
(45) Date of Patent: Nov. 30, 2004

(54) TRANSFER VALVE SYSTEM

(75) Inventors: Boris K. Kogan, Naugatuck, CT (US); William F. Lange, Woodbridge, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 83 days.

(21) Appl. No.: 10/405,720

(22) Filed: Apr. 2, 2003

(65) Prior Publication Data

US 2004/0194458 A1 Oct. 7, 2004

(51) Int. Cl.[7] .............................................. F16D 31/02
(52) U.S. Cl. .......................................... 60/405; 60/430
(58) Field of Search .......................... 60/430, 405, 428

(56) References Cited

U.S. PATENT DOCUMENTS 3,791,775 A * 2/1974 Bochnak et al. .............. 60/405
3,913,324 A * 10/1975 Miller et al. .................. 60/405
4,164,119 A * 8/1979 Parquet ........................ 60/430
6,173,728 B1 * 1/2001 Venable et al. ............... 60/405

* cited by examiner

*Primary Examiner*—Justine R. Yu
*Assistant Examiner*—Michael Leslie
(74) *Attorney, Agent, or Firm*—Bachman & LaPointe, P.C.

(57) ABSTRACT

A hydraulic transfer valve system has a main valve selectively placing one of a primary and secondary hydraulic system in communication with a hydraulic load. A pilot valve provides a toggling action between the primary and secondary systems with respect to pressure changes in such systems.

14 Claims, 4 Drawing Sheets

TRANSFER VALVE SYSTEM

BACKGROUND OF THE INVENTION (1) Field of the Invention

This invention relates to hydraulics, and more particularly to transfer valve systems for aircraft hydraulics (2) Description of the Related Art In an aircraft, a transfer valve (also known as a switching valve) is used to direct pressure and flow from one of two available hydraulic supply systems to a downstream circuit. The valve switches between supply systems based on the relative magnitudes of the system pressures and a pressure bias built into the valve. The bias is often achieved by providing different pilot areas on each end of the valve, the larger of the pilot areas being on the end acted upon by the preferred, or primary, system. A spring is also sometimes used to provide a bias. With both supply pressures at normal operating pressure, the forces acting on the valve are such that the preferred (primary) system is connected to the circuit and the other (secondary/back-up) system is blocked. The purpose of a transfer valve is to allow the back-up system to take over for a failed or failing primary system. The transfer valve also isolates one hydraulic supply system from the other. As the primary system pressure decays, the force balance on the valve favors the primary system less and the back-up system more, until eventually the valve shuttles from the initial primary position to the back-up position. In the back-up position the valve connects the back-up system to the circuit and blocks the primary system.

Once pressures reach the switchover condition, the transfer valve advantageously shuttles with a snapping action, without interruption, hesitation, or instability. The snapping action is advantageous for two reasons. First, it minimizes transient pressure spikes as the valve closes off flow from one system and opens flow from the other. Second, it prevents the forces acting on the valve from achieving equilibrium when the valve is mid travel. If the valve stops mid travel it could block both supply systems and create a hydraulic lock in the downstream circuit. This snapping action can be enhanced through the use of a mechanical, hydraulic or electric detent mechanism.

Two well known styles of transfer valve are solenoid-operated and pressure-operated valves. Solenoid-operated transfer valves provide a high degree of control. The transfer valve can be switched from one system to the other by energizing and de-energizing the solenoid. Because the solenoid controls when the valve shuttles, this design does not require a detent mechanism. This approach is generally relatively complicated and requires a suitable electronic computer or system to control the solenoid. In addition to the computer system, some means of sensing pressure is required. Because this approach is more complicated, it requires a higher level of redundancy and is generally more expensive.

Pressure-operated valves shuttle based on the relative pressures of the two supply systems and the pressure bias and detent action designed into the valve. This style or transfer valve may require no inputs from other devices. Pressure-operated transfer valves may make use of a hydraulic or mechanical detent to achieve the desired valve behavior. With a mechanical detent, a mechanism holds the valve in position until sufficient shuttling force is developed to overcome the detent. Once the detent is overcome, the valve moves away from the detent and the detent force no longer acts to hold the valve in position. With the detent force suddenly removed, the forces acting on the valve are no longer in equilibrium and the valve shuttles with a deliberate motion. Mechanical detents are typically spring-loaded devices. The mechanical detent may introduce friction and side loads on the valve spool, both of which have a negative effect on the valve's switching characteristic.

BRIEF SUMMARY OF THE INVENTION

Accordingly, one aspect of the invention involves a hydraulic transfer valve system for coupling one of primary and secondary hydraulic systems to a hydraulic load. The hydraulic systems each have a source and a return and the load has an input and a return. The system has first and second valves and a passageway coupling the first valve to the second valve and having first and second ports at the first and second valves, respectively. The first valve has a first condition in which it provides communication between the primary hydraulic system source and the hydraulic load input, provides communication between the primary hydraulic system return and the hydraulic load return, blocks communication between the secondary hydraulic system source and the hydraulic load input, provides communication between the secondary hydraulic system return and the hydraulic load return, and blocks the passageway first port. The first valve has a second condition in which it provides communication between the secondary hydraulic system source and the hydraulic load input, provides communication between the secondary hydraulic system return and the hydraulic load return, blocks communication between the primary hydraulic system source and the hydraulic load input, provides communication between the primary hydraulic system return and the hydraulic load return, and does not block the passageway first port. The second valve has a first condition in which it blocks the passageway second port and a second condition in which it does not block the passageway second port and herein, with the first valve in its second condition, the passageway permits a flow from the primary hydraulic system source to the primary hydraulic system return.

In various implementations the valves may be sliding spool valves. The valves may be spring-biased in a direction from their second conditions to their first conditions. Pressure from the primary hydraulic system source may bias the valves in the directions from their second conditions to their first conditions. Pressure from the secondary hydraulic system source may bias the valves in directions from their first conditions to their second conditions. With the valves in their first conditions, a recirculating flow from the secondary source to the secondary return may be permitted through the second valve. A pressure sensor may be coupled to the second valve and output a signal indicative of a pressure in the secondary hydraulic system.

Another aspect of the invention involves a hydraulic transfer valve system with means for piloting a first valve so that with primary and secondary hydraulic systems initially operating normally and the first valve in its first condition, a decrease in a pressure of the primary hydraulic system source relative to the secondary hydraulic system source causes the first valve to toggle to its second condition. With the secondary hydraulic system initially operating normally and the primary hydraulic system source initially operating with an insufficient pressure and the first valve in its second condition, a sufficient increase in the pressure of the primary hydraulic system source relative to the secondary hydraulic system source causes the first valve to toggle to the first condition.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
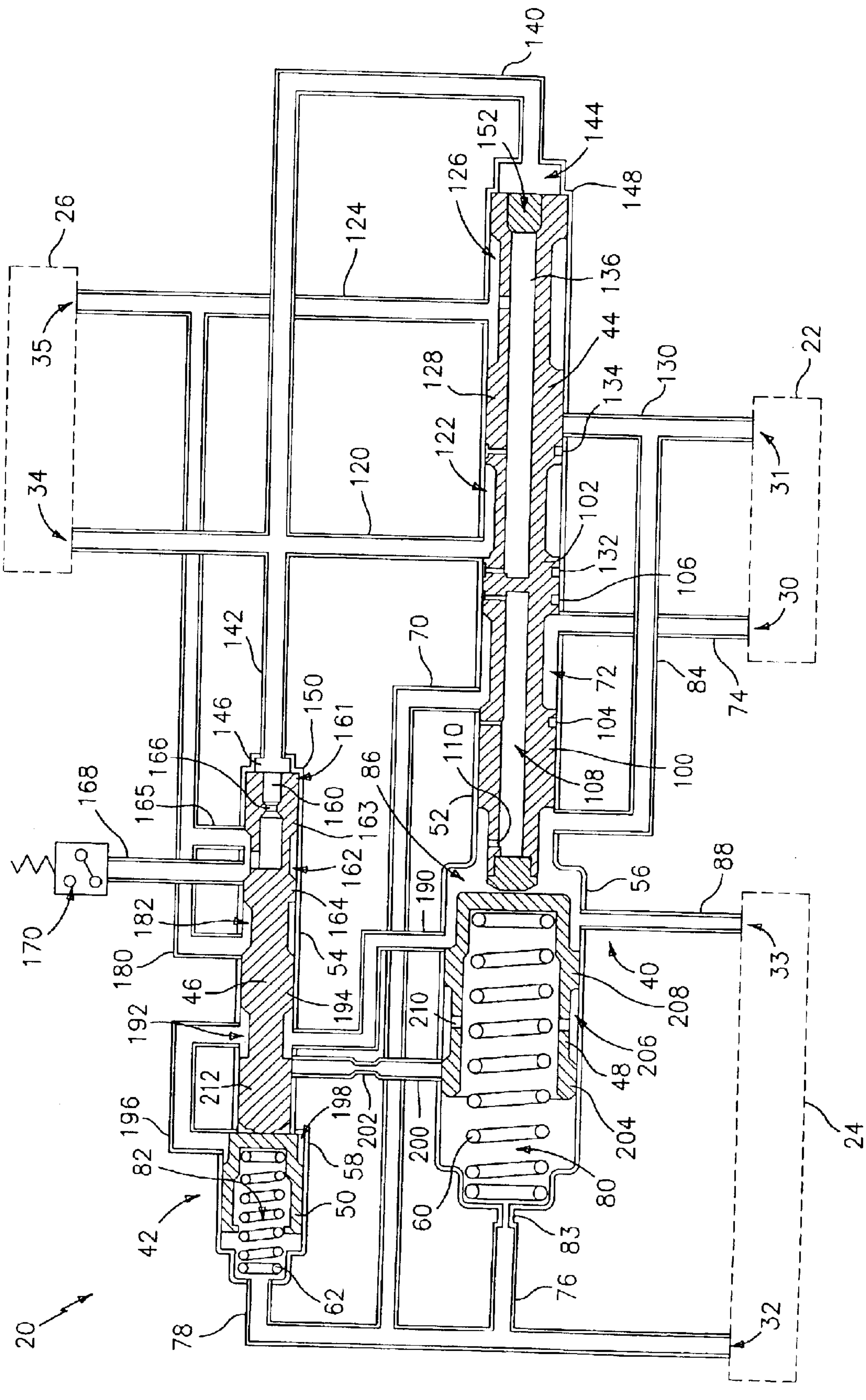
FIG. 1 is a partially schematic view of a transfer valve system in a normal operating condition.

FIG. 1 shows a transfer valve system 20 coupling a hydraulic load or circuit 22 to primary and secondary hydraulic systems 24 and 26. The circuit 22 has an input 30 for receiving hydraulic fluid from an engaged one of the systems and a return 31 for returning fluid to such engaged system. The primary system. 24 has a source 32 and a return 33. The secondary system 26 has a source 34 and a return 35. The system sources and returns may respectively be coupled to associated pumps and reservoirs (not shown). The transfer valve system 20 includes a main valve 40 and a pilot valve 42. In the exemplary embodiment, both valves are spool-type valves having spools 44 and 46 and pistons 48 and 50. The spools are mounted for reciprocal motion within sleeves or cylinders 52 and 54. Likewise, the pistons are mounted for reciprocal movement in sleeves or cylinders 56 and 58 at proximal ends of the associated spool cylinders 52 and 54. Springs 60 and 62 extend from the opposite ends of the piston cylinders and into the associated pistons to bias the pistons toward their associated spools.

FIG. 1 shows a normal operating condition of the system 20. In this condition, the system input 30 and return 31 are respectively coupled to the primary source 32 and primary return 33. Both valve pistons are in relatively distal positions. In this condition, a conduit branch or passageway 70, communicating with the primary source 32, has a port on the main spool cylinder 52 at the proximal end of an annular chamber or cavity 72 of the spool 44. A conduit 74 leading to the circuit input 30 has a port on the cylinder 52 at the distal end of that chamber. Thus the circuit input 30 communicates with the primary source 32 via the annular chamber 72. Additional conduits 76 and 78 communicating with the primary source 32 provide communication between the primary source 32 and proximal volumes 80 and 82 of the piston cylinders 56 and 58. A restriction 83 (described below) is located in the conduit 76 at an inlet to the volume 80. In the normal condition, pressure from the primary source 32 acting on the pistons 48 and 50 along with the compression force of the associated springs 60 and 62 biases each piston toward its distal position. A conduit 84 in communication with the circuit return 31 has a port on the cylinder 52 near a proximal end thereof and in communication with a distal headspace 86 of the cylinder 56 in the normal condition. A conduit 88 in communication with the primary return 33 has a port on the cylinder 56 also communicating with the headspace 86. Thus normal condition communication between the circuit return 31 and primary return 33 is via the headspace 86.

Adjacent the annular chamber 72, the lands 100 and 102 of the spool have smaller annular chambers 104 and 106 communicating with a central proximal compartment 108 within the spool by associated ports or apertures. The compartment 108 is vented to the headspace 86 via an aperture 110 near the proximal end of the compartment 108. In operation, high pressure leakage out of the chamber 72 will be vented into the compartment 108 via the chambers 104 and 106 and then passed to the headspace 86 via the aperture 110. This helps isolate the flow within the primary system and prevents leakage and cross-communication between the primary and secondary systems. Similar features (discussed below) are provided for the secondary system. A conduit 120 communicating with the secondary source 34 has a port on the cylinder 52 at a proximal end of an annular chamber 122 located immediately distally of the land 102. A conduit 124 communicating with the secondary return 35 has a port in the cylinder 52 at an annular chamber 126 located distally of the chamber 122 and separated therefrom by a land 128. In the normal condition of FIG. 1, the chambers 122 and 126 are not in communication with any other ports on the cylinder 52. A conduit 130 communicating with the circuit return 31 has a port on the cylinder 52. This port and thus the conduit 130 is normally blocked by the land 128. Annular channels 132 and 134 immediately distally and proximally of the chamber 122 respectively in the lands 102 and 128 communicate with a central distal compartment 136 of the spool 44 via associated apertures. The distal compartment 136 communicates with the chamber 126 and thus with the secondary return 35. Accordingly, secondary source leakage from the chamber 122 passes through the chambers 132 and 134 and into the compartment 136 to return to the secondary return 35 via the chamber 126 so as to, thereby, isolate the secondary system.

Conduits 140 and 142 in communication with the secondary source 34 have ports at the respective distal headspaces of the spool cylinders 52 and 54. The exemplary spool cylinders are of smaller diameter and cross-section than their associated piston cylinders. Pressure from the secondary source 34 acting on the headspaces 144 and 146 produces a smaller counterforce than the force from the primary source 32 on the volumes 80 and 82 (which primary source force is also augmented by the relatively small associated spring force). In the normal condition this pressure balance maintains the piston distal ends contacting the associated spool proximal ends and maintains the spools at distalmost positions determined by stop shoulders 148 and 150 separating a wall surrounding the normal condition headspaces 144 and 146 from main body portions of the cylinders 52 and 54.

In the exemplary embodiment, the distal end 152 of the primary spool 44 is sealed. The pilot spool 46 has a passageway 160 extending through its distal end 161 and communicating with a distal annular chamber 162 between a distal end land 163 and an adjacent land 164 via a port in the spool. At a distal end of the chamber 162, a conduit 165 in communication with the secondary return 35 has a port on the cylinder 54. In the normal condition, the passageway 160 permits a recirculating flow of fluid from the secondary source 34 to the secondary return 35. A constriction 166 is located within the passageway 160 to limit the rate of the recirculating flow. At a proximal end of the chamber 162, a conduit 168 has a port on the cylinder 154 and provides communication with a pressure sensor 170. In this normal operating condition, the pressure sensor 170 thus outputs a signal indicative of the operating pressure of the secondary system. If the secondary system were to fail or otherwise shutdown, the pressure sensor 170 would provide an indication of the associated pressure drop.

A number of additional conduits are inoperative or less relevant in the normal operating condition. A conduit 180 in communication with the secondary return 35 has a port on the cylinder 54 at an annular chamber 182 separated from the chamber 162 by the land 164. The conduit 180 provides a return path for leakage over the land 164 from the chamber 162. To minimize leakage/contamination it may be advantageous that source pressure from one system not be adjacent to a return of the other in any of the valves. A conduit 190 has a port at the main piston cylinder headspace 86 and a port on the pilot spool cylinder 54 at an annular chamber 192 located proximally of the chamber 182 and separated therefrom by a land 194. A conduit 196 has a port on the cylinder 54 at the chamber 192 and a port at the headspace 198 of the pilot piston cylinder 58. In the normal operating condition, the conduits 190 and 196 serve to expose the pilot piston cylinder headspace 198 to the pressure of the primary return 33. A conduit 200 having a restriction 202 has a port on the main piston cylinder 56. In the normal condition, this port is blocked (just barely overlapped) by a proximal land 204 separated by a chamber 206 from a distal land 208. The piston 48 has apertures 210 providing communication between a volume 80 and the chamber 206. The conduit 200 has a second port, at its opposite end, on the pilot spool cylinder 54. In the normal condition, this port is blocked (just barely overlapped) by a proximal land 212 of the spool 46 adjacent the chamber 192.

Figure 2:
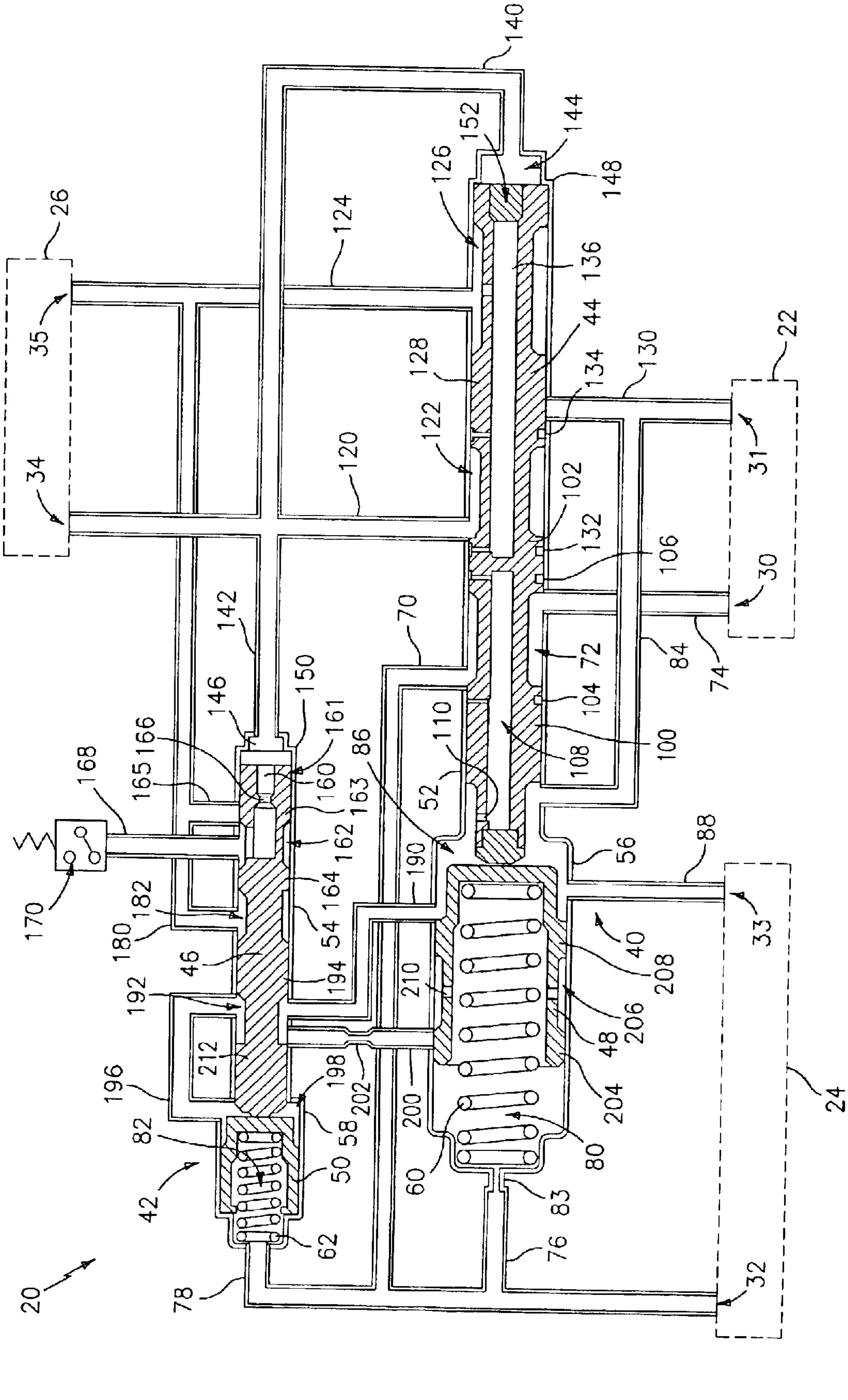
FIG. 2 is a partially schematic view of the system of FIG. 1 in an intermediate condition before switching to backup operation.
Figure 3:
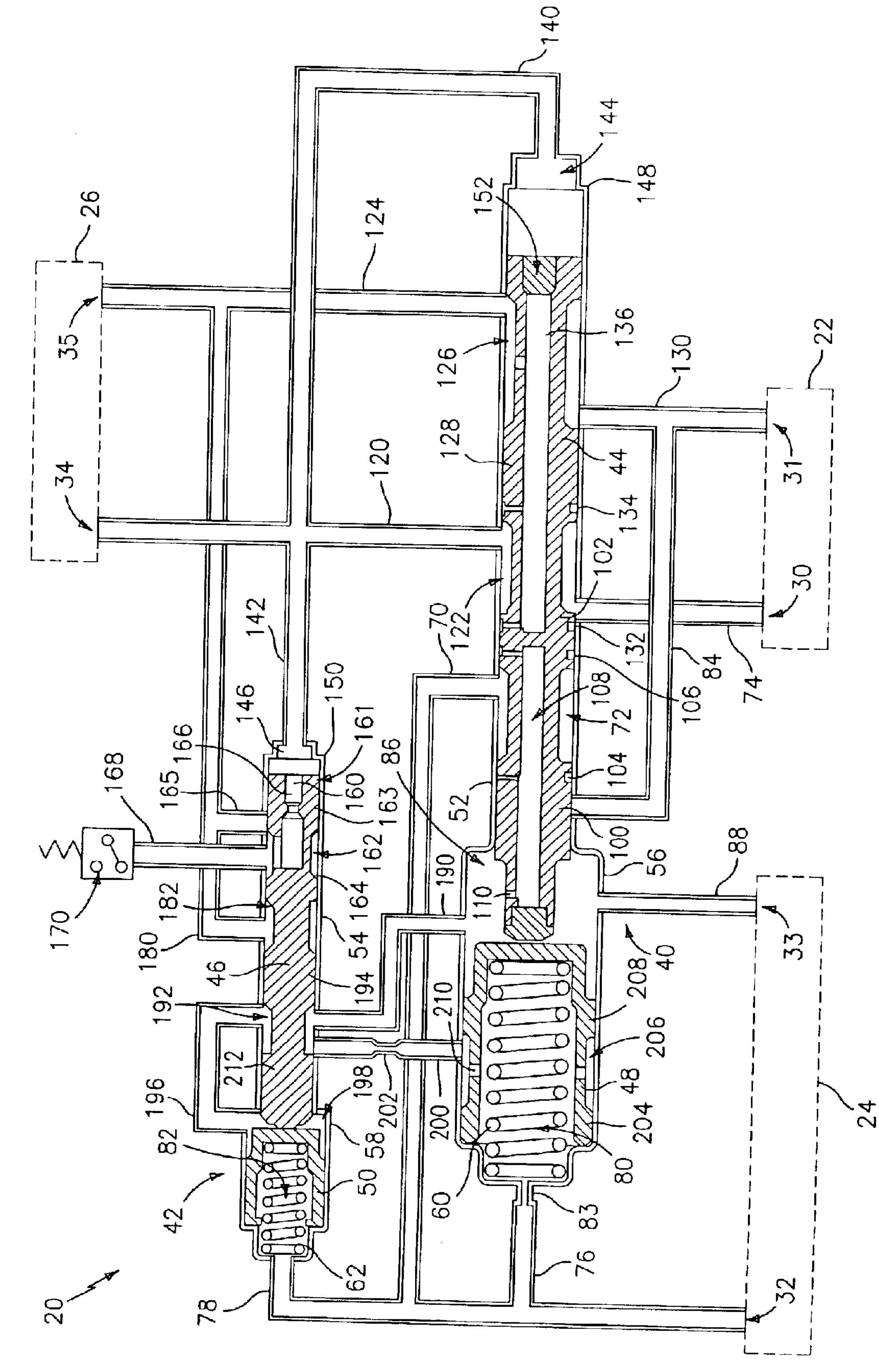
FIG. 3 is a partially schematic view of the system of FIG. 1 in a backup condition.

In a failure of the primary system, the pressure of the primary source will drop. The nature of the drop will depend upon the nature of the failure. For example, a normal operational pressure of the sources may be in the vicinity of 4000 psi. As the primary source pressure begins to drop, the distal biasing force from primary system fluid in the chambers 80 and 82 will drop. The valve geometries and spring forces are such that this has a greater initial impact in the pilot valve than in the main valve. At a moderate reduction in pressure (e.g., from 4000 psi down to 3500 psi) the proximally-directed forces on the piston 50 (including the force from the secondary source acting on the spool 46 in the headspace 146) is sufficient to overcome the distally-directed forces (including those from the primary source and spring 62). Over a very small further pressure drop, the pilot valve shuttles proximally to the condition of FIG. 2 with the piston 50 and spool 46 in proximal positions. In these positions, the valve condition is such that the distal land 163 blocks the port of the conduit 164 and the proximal land 212 is clear of the pilot piston cylinder port of the conduit 200 so that the conduits 190, 196, and 200 all communicate with the chamber 192. In this condition, the main piston cylinder port of the conduit 200 is still blocked by the proximal land 204 of the piston 48. In this condition, the secondary recirculating flow through the conduit 164 is blocked. This interruption may initially cause a slight increase in the pressure from the secondary source 34 as measured by the sensor 170. This pressure increase is also felt in the headspace 144 of the main spool cylinder. This pressure increase, along with any further decrease in primary source pressure (e.g., below 2,530 psi) will cause the primary spool and piston to be shifted slightly proximally so that the land 204 begins to underlap the main piston cylinder port of the conduit 200. This port opening provides a venting of primary fluid from the chamber 80 through the apertures 210 and annular chamber 206 and into the conduit 200. From the conduit 200, this flow passes through the annular chamber 192, through the conduit 190 and through the headspace 86 and conduit 88 to the primary return 33. This flow contributes to a sharp drop in the pressure difference across the piston 48. The resulting force imbalance from the pressure drop causes the primary piston to rapidly shuttle to a distalmost position of FIG. 3 with the primary spool following. This final shuttling of the main spool 44 makes the switch between primary and secondary systems. During the shuttling, the land 100 blocks the main spool cylinder port of the conduit 84 to block communication between the primary return 33 and circuit return 31. An initial substage of this shuttling also causes the land 102 to block the main spool cylinder port of the conduit 74 thus blocking communication between the circuit input 30 and the primary source 32. In a final substage of this shuttling to the distalmost position, the land 102 again underlaps the main spool cylinder port of the conduit 74 establishing communication between that conduit and the annular chamber 122 which remains in communication with the conduit 120. This establishes communication between the system input 30 and secondary source 34 via the chamber 122. Similarly, in this final substage the land 44 will underlap the main spool cylinder port of the conduit 130 establishing communication between the conduit 130 and the annular chamber 126 which remains in communication with the conduit 124. Thus this substage also establishes communication between the circuit return 31 and the secondary return 35 via the annular chamber 126. With the secondary hydraulic system 26 thus active, flow from the secondary hydraulic system 26 to the circuit 22 will slightly decrease the pressure measured by the sensor 170. In this condition, if there is residual pressure in the primary hydraulic system 24 there can be a recirculating flow through the main piston 48, pilot spool cavity 192, and main cylinder headspace 86.

Figure 4:
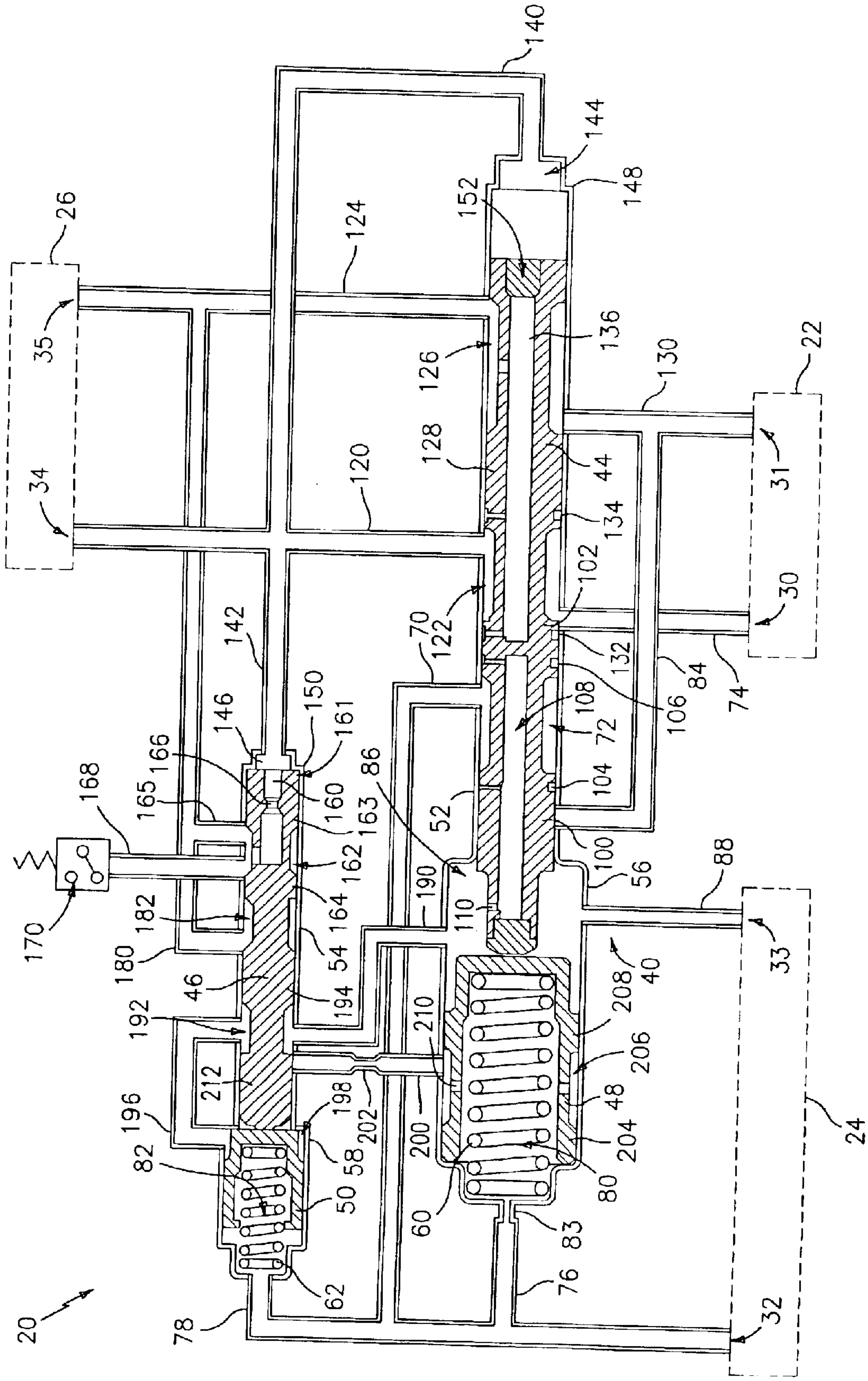
FIG. 4 is a partially schematic view of the system of FIG. 1 in an intermediate condition before returning to normal.

Should full functioning of the primary hydraulic system 24 be reestablished, the exemplary implementation provides for toggling back to use of the primary system. As primary system pressure increases, initially the flow through the piston apertures 210 prevents this pressure change from shuttling the primary valve distally. Thus, although the primary valve shuttled to its distal position after the pilot valve shuttled, it does not shuttle back before the pilot valve does. As the primary source pressure increases to a threshold value (e.g. an exemplary 2930 psi) the pressure balance on the pilot valve permits the pilot valve piston and spool to shuttle back to their initial distal positions (FIG. 4). This shuttling, inter alia, causes the pilot spool proximal land 212 to overlap the associated port of the conduit 200 thereby terminating the recirculating flow of the primary system through the piston apertures 210. This termination can further increase primary system pressure. Additionally, the shifting of the pilot spool reestablishes flow through the conduit 164, slightly decreasing pressure in the secondary system. These pressure changes along with a further increase in primary source pressure and along with any associated drop in the pressure at the headspace 86, cause the primary valve piston and spool to rapidly shuttle back to their distal positions of FIG. 1 breaking communication between the secondary hydraulic system 26 and the circuit 22 and establishing communication between the primary hydraulic system 24 and the circuit 22.

Accordingly, it is seen that the exemplary system provides a two-way toggling of the operation of the main valve: both in transferring from the primary system to the secondary system and in transferring back to the primary system.

The pressure sensor or switch 170 may advantageously be used to detect latent failures of the pilot valve. If the pilot valve were stuck, the transfer valve might continue to operate, although not at proper pressure thresholds and the aircrew or control system would be otherwise unaware of the failure. The state of the sensor may be periodically checked during a flight or mission to determine that the pilot valve is in the appropriate position. The sensor may be checked during preflight operations when the secondary system is pressurized and the primary system is not. Under these conditions, the pilot valve should be positioned that it blocks the connection to return, causing the sensor to be pressurized. In flight, the pilot valve should be positioned such that it opens the connection to return, causing the sensor to be unpressurized. The value at which the sensor trips may not be particularly critical as it may behave like a binary on-off switch. The size/geometry of the orifice 166 substantially determines the flow through the secondary system when the secondary system is inactive. This may be dictated or influenced by the performance characteristics of the secondary system. The relationship (e.g., size ratio) between the orifices 83 and 202 substantially determines the pressure at which the transfer valve shuttles in the event of a failed (e.g., jammed) pilot valve. The orifices 83 and 202 in series determine the inactive primary system flow, similar to the role of the orifice 166 for the secondary system. In operation, it is anticipated that the spool and piston of each valve will maintain their engagement to each other and thus may be further integrated. The geometry and spring bias will advantageously be such that under no anticipated conditions will return pressure transients be large enough to cause spool/piston separation. The two-piece construction aids maufacturability.

The relationship between: (a) the ratio of (i) the cross-sectional area of the pilot valve piston acted upon by the primary system pressure to (ii) the cross-sectional area of the pilot valve spool acted upon by the secondary pressure; and (b) the ratio of (i) the cross-sectional area of the main valve piston acted upon by the primary system pressure to (ii) the cross-sectional area of the main valve spool acted upon by the secondary system pressure will influence the shuttling action of the primary valve. The former should be smaller than the latter. This causes the pilot valve to shuttle first so as to give the transfer valve an advantageous snapping detent action characteristic when shuttling from primary to secondary systems. For example, at exemplary normal operating source pressures of 4000 psi (and return pressures essentially zero), the valves may be configured so that the initial shuttle of the pilot occurs when the primary source pressure drops to a first threshold in the range of 2200–3200 psi (55–80% of normal), more narrowly 2700–3000 (67.5–75%) psi. The main may then shuttle at a lower pressure in the range of 1700–2600 psi (42.5–65%), more narrowly 2300–2500 psi (57.5–62.5%). A resumption in primary source pressure may shuttle the valves back nearly simultaneously at one or more thresholds in the range of 2700–3400 psi (67.5–85%), more narrowly 2900–3100 psi (72.5–77.5%). If the pilot is jammed in its second position, the main may shuttle back as a somewhat higher pressure in the range of 2800–3500 psi (70–87.5%), more narrowly 3200–3500 psi (80–87.5%). With another normal pressure (e.g., 3000 psi), the shuttling pressures could be at similar percentages.

One or more embodiments of the present invention have been described. Nevertheless, it will be understood that various modifications may be made without departing from the spirit and scope of the invention. For example, if applied as a redesign or retrofit of an existing transfer valve system, various features of the existing system may influence the implementation. Accordingly, other embodiments are within the scope of the following claims.

What is claimed is:

1. A hydraulic transfer valve system for coupling one of primary and secondary hydraulic systems, each having a source and a return, to a hydraulic load having an input and a return, the hydraulic transfer valve system comprising:

a first valve;

a second valve; and a passageway coupling the first valve to the second valve and having first and second ports at said first and second valves, respectively, the first valve having:

a first condition in which the first valve:

provides communication between the primary hydraulic system source and the hydraulic load input;

provides communication between the primary hydraulic system return and the hydraulic load return;

blocks communication between the secondary hydraulic system source and the hydraulic load input;

provides communication between the secondary hydraulic system return and the hydraulic load return; and blocks the passageway first port; and a second condition in which the first valve:

provides communication between the secondary hydraulic system source and the hydraulic load input;

provides communication between the secondary hydraulic system return and the hydraulic load return;

blocks communication between the primary hydraulic system source and the hydraulic load input;

provides communication between the primary hydraulic system return and the hydraulic load return; and does not block the passageway first port; and the second valve having;

a first condition in which the second valve blocks the passageway second port; and a second condition in which the second valve does not block the passageway second port and wherein with the first valve in its second condition, the passageway permits a flow from the primary hydraulic system source to the primary hydraulic system return.

2. The hydraulic transfer valve system of claim 1 wherein:

the first valve is a sliding spool valve; and the second valve is a sliding spool valve.

3. The hydraulic transfer valve system of claim 1 wherein:

the first valve is spring-biased in a direction from its second condition to its first condition; and the second valve is spring-biased in a direction from its second condition to its first condition.

4. The hydraulic transfer valve system of claim 1 wherein:

pressure from the primary hydraulic system source biases the first valve in a direction from its second condition to its first condition;

pressure from the primary hydraulic system source biases the second valve in a direction from its second condition to its first condition;

pressure from the secondary hydraulic system source biases the first valve in a direction from its first condition to its second condition; and pressure from the secondary hydraulic system source biases the second valve in a direction from its first condition to its second condition.

5. The hydraulic transfer valve system of claim 1 wherein:

with the first valve in its first condition and the second valve in its first condition, a recirculating flow from the secondary source to the secondary return is permitted through the second valve.

6. The hydraulic transfer valve system of claim 1 further comprising a pressure sensor coupled to the second valve and outputting a signal indicative of a pressure in the secondary hydraulic system.

7. A hydraulic transfer valve system for coupling one of primary and secondary hydraulic systems, each having a source and a return, to a hydraulic load having an input and a return, the hydraulic transfer valve system comprising:

a first valve;

a second valve; and a passageway coupling the first valve to the second valve and having first and second ports at said first and second valves, respectively, the first valve having:

a first condition in which the first valve:

provides communication between the primary hydraulic system source and the hydraulic load input;

provides communication between the primary hydraulic system return and the hydraulic load return;

blocks communication between the secondary hydraulic system source and the hydraulic load input; and provides communication between the secondary hydraulic system return and the hydraulic load return; and a second condition in which the first valve:

provides communication between the secondary hydraulic system source and the hydraulic load input;

provides communication between the secondary hydraulic system return and the hydraulic load return;

blocks communication between the primary hydraulic system source and the hydraulic load input; and provides communication between the primary hydraulic system return and the hydraulic load return; and at least one of the first and second valves having means for piloting the first valve so that:

with the primary and secondary hydraulic systems initially operating normally and the first valve in the first condition, a decrease in a pressure of the primary hydraulic system source relative to the secondary hydraulic system source causes the first valve to toggle to the second condition; and with the secondary hydraulic system initially operating normally and the primary hydraulic system source initially operating with an insufficient pressure and the first valve in the second condition, a sufficient increase in the pressure of the primary hydraulic system source relative to the secondary hydraulic system source causes the first valve to toggle to the first condition.

8. The hydraulic transfer valve system of claim 7 wherein:

the means are configured so that:

said decrease causes said second valve to shift from a first condition to a second condition at a first threshold pressure between 2200 and 3200 psi; and said decrease causes said first valve to shift from its first condition to its second condition at a second threshold pressure, less than the first threshold pressure and between 1700 and 2600 psi.

9. The hydraulic transfer valve system of claim 8 wherein:

said first threshold pressure is between 2700 and 3000 psi; and said second threshold pressure is between 2300 and 2500 psi.

10. The hydraulic transfer valve system of claim 8 wherein the means are configured so that:

said increase causes both the first and second valves to shift to their first conditions at one or more third threshold pressures between 2700 and 3400 psi.

11. The hydraulic transfer valve system of claim 10 wherein said one or more third threshold pressures between 2900 and 3100 psi.

12. The hydraulic transfer valve system of claim 8 wherein the means are configured so that if the second valve is jammed in its second condition:

said increase causes the first valve to shift to its first condition at a third threshold pressure, greater than the first threshold pressure, and between 2800 and 3500 psi.

13. The hydraulic transfer valve system of claim 8 wherein said third threshold pressure is between 3200 and 3500 psi.

14. The hydraulic transfer valve system of claim 7 wherein:

the means are configured so that:

said decrease causes said second valve to shift from a first condition to a second condition at a first threshold pressure between 55 and 80% of a normal operating pressure of at least one of the primary and secondary hydraulic systems;

said decrease causes said first valve to shift from its first condition to its second condition at a second threshold pressure, less than the first threshold pressure and between 42.5 and 62.5% of said normal operating pressure;

said increase normally causes both the first and second valves to shift to their first conditions at one or more third threshold pressures between 67.5 and 85% of said normal operating pressure; and if the second valve is jammed in its second condition said increase causes the first valve to shift to its first condition at a fourth threshold pressure, greater than the first threshold pressure, and between 70 and 87.5% of said normal operating pressure.

* * * * *